United States Patent [19]

Yamanouchi et al.

[11] Patent Number: 5,130,522
[45] Date of Patent: Jul. 14, 1992

[54] ID CARD USING SURFACE ACOUSTIC WAVES

[75] Inventors: Kazuhiko Yamanouchi, Sendai; Keiichi Morishita, Takasago, both of Japan

[73] Assignee: Mitsubishi Jukogyo Kabushiki Kaisha, Tokyo, Japan

[21] Appl. No.: 568,555

[22] Filed: Aug. 16, 1990

[30] Foreign Application Priority Data

Aug. 17, 1989 [JP] Japan .................................. 1-210631

[51] Int. Cl.$^5$ ........................ G06K 7/00; G06K 19/06
[52] U.S. Cl. ...................................... 235/492; 235/439
[58] Field of Search ................ 235/492, 487, 439, 493; 340/825.3, 825.31, 825.34; 333/186

[56] References Cited

U.S. PATENT DOCUMENTS

| | | | |
|---|---|---|---|
| 3,706,094 | 12/1972 | Cole et al. | 343/6.5 |
| 4,658,252 | 4/1987 | Rowe | 340/825.31 |
| 4,980,680 | 12/1990 | Knoll et al. | 307/10.5 |

Primary Examiner—Stuart S. Levy
Assistant Examiner—Richard M. Weinberg
Attorney, Agent, or Firm—Stanger, Michaelson, Spivak & Wallace

[57] ABSTRACT

An ID card includes an electric wave receiver for receiving an electric wave from a main station, a modulator for modulating a received signal in accordance with an ID number, and an electric wave transmitter for transmitting a modulated electric wave signal to the main station. The main station identifies the ID card on the basis of the modulated electric wave signal. The ID card further includes a surface acoustic wave exciting device for coupling the electric wave receiver and the electric wave transmitter through surface acoustic wave on a piezoelectric substrate by means of the modulator and a circuit including a terminating device and a switching element and connected in parallel with the surface acoustic wave exciting device. The switching element is controlled to be turned on and off in accordance with the ID number to control the coupling between the electric wave receiver and the electric wave transmitter.

2 Claims, 3 Drawing Sheets

ID CARD USING SURFACE ACOUSTIC WAVES

FIELD OF THE INVENTION AND RELATED ART STATEMENT

The present invention relates to an ID card (identification card) of non-contact type used in a toll collecting machine for a toll road, an entrance and exit supervisory system for a room, a line control system in a factory or the like.

It is known that a reflection type modulator for a transponder is used as an ID card. The transponder is a wireless machine of a type in which a sub-station responds to a call from a main station.

A non-contact identification system shown in FIG. 4 is now described by way of example.

This system has a main station including a transmitting and receiving antenna 51, a radio transmitter-receiver 42, a discriminator 45 and a personal computer 46. When an ID card 47 of a sub-station enters into a communication region formed by the antenna 41, the ID card 47 modulates an incident wave 48 of a calling electric wave in accordance with an ID number of the sub-station itself and transmits it back as a reflected wave 49 to the main station. The main station receives the reflected wave 49 with the antenna 41 and demodulates it with a receiving unit of the radio transmitter-receiver 42. Then, the ID number is recognized by the discriminator 45. The discriminated ID number is supplied to the microcomputer 46 through an interface and is processed. The system can recognize a person or an object having the ID card on a non-contact basis and accordingly can be applied to various fields such as the entrance and exit supervision for a room, a line control in a factory, and parking place supervision.

As shown in FIG. 5, a conventional reflection type modulator 51 is provided in an ID card 60 and includes a switch 54 and a reflection controller 50 made of semiconductors such as a rectifier and a varactor diode. The switch 54 is opened and closed in accordance with an ID number registered in a memory 57 and transmitted in synchronism with a timing signal of the clock circuit 58 and controls the reflection controller 50. The impedance of the reflection controller 50 as viewed from the antenna 55 is varied in accordance with the opened and closed states of the switch 54 to control a reflection amount so that modulation can be performed in accordance with the ID number. More particularly, when a bit stream of the ID number is "H", the switch 54 is opened to increase or decrease the impedance of the reflection controller 50 so that almost all energy of an electric wave received by the antenna 55 is reflected. Further, when the bit stream is "L", the switch 54 is closed to cause the impedance of the reflection controller 50 to be matched with an impedance of the antenna 50 so that energy of the received wave is transmitted to a subsequent stage. In this manner, the reflection type modulator 51 consisting of the switch 54 and the reflection controller 50 serves to control energy of the received wave in accordance with the ID number and modulate an amplitude of the incident wave. Numeral 59 denotes a power supply.

OBJECT AND SUMMARY OF THE INVENTION

In the conventional reflection type modulator, however, since the semiconductors are used in the reflection controller, the impedance matching for controlling the reflection amount is difficult due to dispersed characteristics of the semiconductors and communication with high reliability does not occur. Further, use of the semiconductors limits thinning of the ID card and low power consumption which are required for the ID card.

It is an object of the present invention to provide an ID card which can solve the above problems in the prior art.

The problems is solved by an ID card comprising a surface acoustic wave excitation type modulator including an exciting electrode disposed on a piezoelectric substrate for exciting surface acoustic wave in accordance with operation of a switch.

More particularly, in order to solve the above problem, in the present invention, a surface acoustic wave excitation type modulator is configured by providing a surface acoustic wave excitation electrode in a reflection controller and is utilized as the ID card.

In the surface acoustic wave excitation type modulator provided in the ID card according to the present invention, an electrode excites the surface acoustic wave in accordance with opening and closing of a switch. Accordingly, when the surface acoustic wave is excited, the incident wave from an antenna is returned as a reflected wave and when the surface acoustic wave is not excited, the reflected wave is not generated. Thus, the excitation type modulator modulates the incident wave in accordance with the ID signal inputted to the switch.

DETAILED DESCRIPTION OF PREFERRED EMBODIMENT

Figure 1:
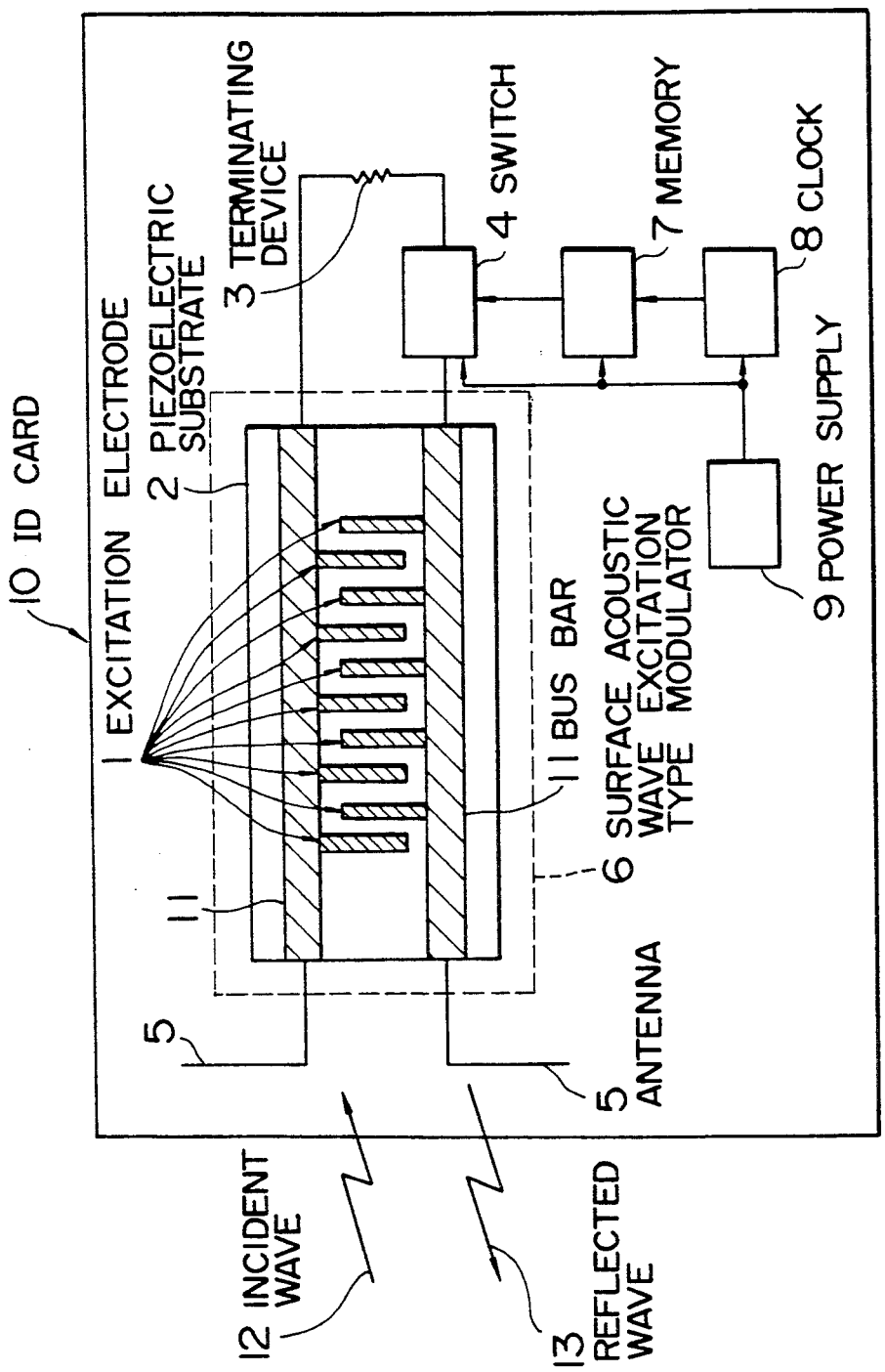
FIG. 1 is a block diagram schematically illustrating a configuration of an ID card according to the present invention.

Referring to FIG. 1, excitation electrodes 1 are formed into a comb configuration having a width of a quarter wave length (λ/4) and excite a surface acoustic wave in accordance with operation of a switch 4. The excitation electrodes 1 are connected to bus bars 11 through which an incident wave 12 received by an antenna 5 is applied to the excitation electrodes and the electrodes are disposed on a piezoelectric substrate 2. A terminating device 3 is connected through the switch 4 to the bus bar 11 and when the switch 4 is closed, the terminating device 3 absorbs the incident wave 12 received by the antenna 5. The switch 4 is disposed between the terminating device 3 and the bus bar 11 to connect and disconnect the bus bar and the terminating device in accordance with a bit stream "H" and "L" of a control signal from a memory 7.

In the surface acoustic wave excitation type modulator 6, a bit stream of the ID number registered in the memory 7 is supplied as the control signal to the switch 4 in synchronism with a clock pulse of a clock generator 8 to connect and disconnect the bus bar and the terminating device.

Figure 2A:
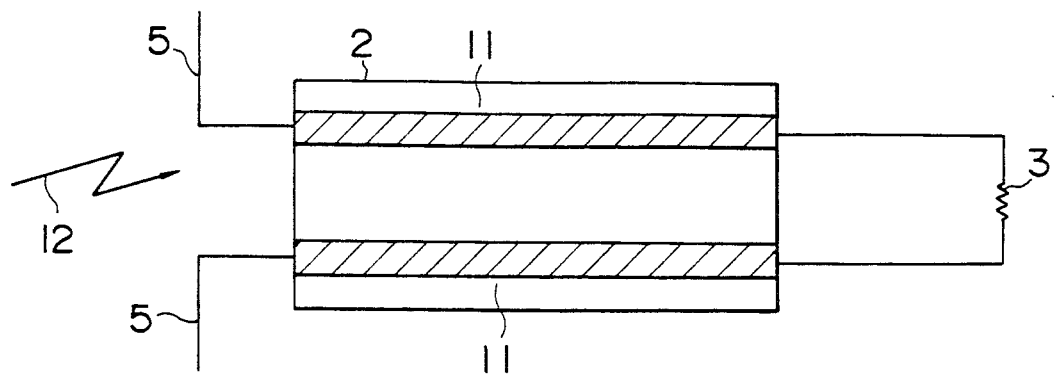
FIG. 2(A) is an equivalent circuit of the ID card of FIG. 1 in the case where a bit of a control signal is "L"
Figure 2B:
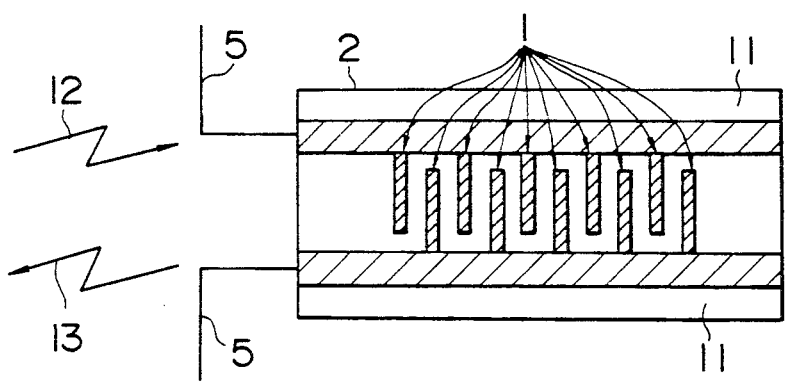
FIG. 2(B) is an equivalent circuit of the ID card of FIG. 1 in the case where a bit of a control signal is "H"
Figure 3:
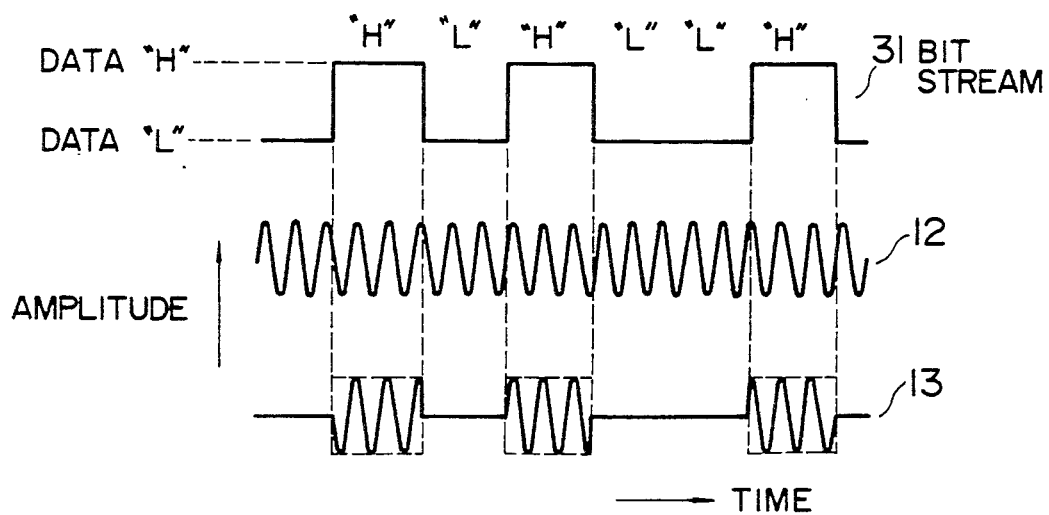
FIG. 3 is a diagram showing waveforms of a control signal, an incident wave signal and a reflected wave signal.
Figure 4:
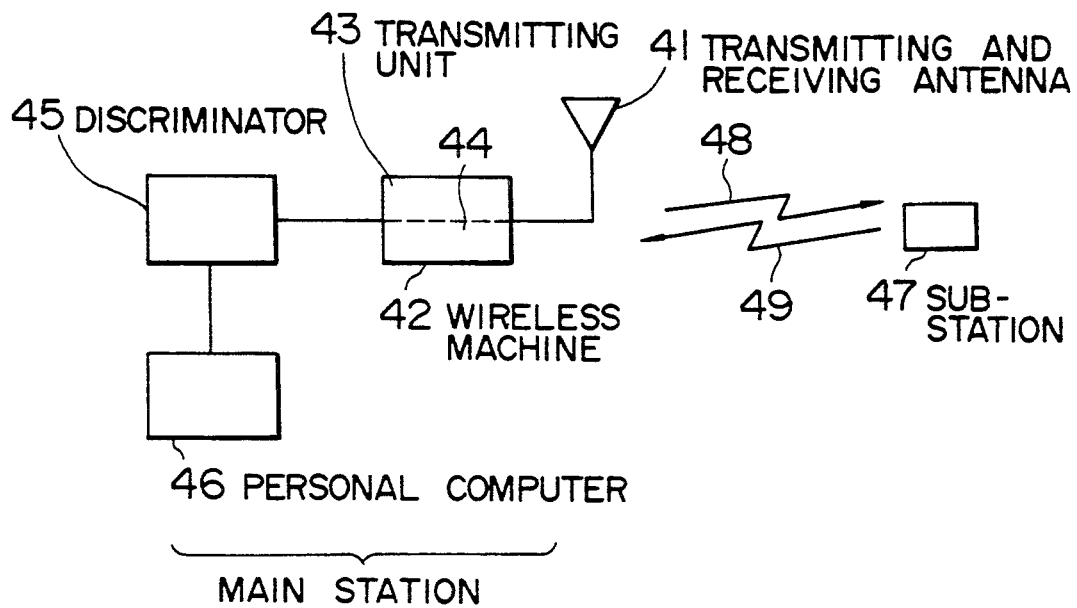
FIG. 4 is a block diagram of a conventional non-contact identification system.
Figure 5:
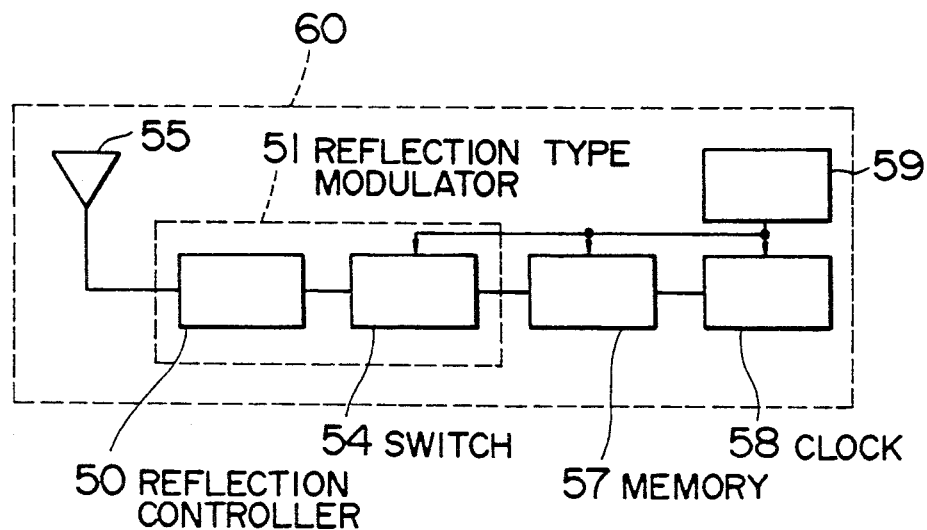
FIG. 5 is a block diagram of an ID card used in the system of FIG. 4.

In the embodiment shown, when a bit of the control signal is "L" as shown in FIG. 2, since the switch 4 is closed, an equivalent circuit of the ID card of FIG. 1 is as shown in FIG. 2(A), while when the bit of the control signal is "H", the switch is opened and the equivalent circuit is as shown in FIG. 2(B). In the circuit configuration of FIG. 2(A), energy of the incident wave 12 received by the antenna 5 is absorbed by the terminating device 3 through the bus bar 11 and no reflected wave is radiated from the antenna 5. On the other hand, in the circuit configuration of FIG. 2(B), the incident wave 12 received by the antenna 5 excites a surface acoustic wave by means of the excitation electrodes 1 through the bus bar 11. The excited surface acoustic wave is radiated again outside as a reflected wave from the antenna through the bus bar 11. In this manner, the reflected wave 13 is amplitude modulated with respect to the incident wave 12 having a fixed amplitude in accordance with "H" and "L" of the bit stream of the control signal.

The effects of the present invention are as follows:

Since the modulation is accomplished by the excitation of the surface acoustic wave through the electrodes, the problem of the impedance mismatch due to the dispersed characteristics of the semiconductors is solved by the technique of fabricating the electrode with high stability and communication with high reliability is performed.

A semiconductor is not used and accordingly low power consumption can be achieved. Simple structure of the electrodes makes the ID card small in structure and light in weight. The present invention improves the reliability in the communication, the productivity and the simplicity in operation greatly.

We claim:

1. An ID card including electromagnetic wave receiving means for receiving an electric wave from a main station, modulation means for modulating a received signal in accordance with an ID number, and electromagnetic wave transmitting means for transmitting a modulated electric wave signal to the main station, the main station identifying the ID card on the basis of the modulated electric wave signal, comprising a surface acoustic wave exciting device for coupling said electromagnetic wave receiving means and said electromagnetic wave transmitting means through a surface acoustic wave on a piezoelectric substrate, a circuit including a terminating device for absorbing the electromagnetic energy and a switch connected in series with said terminating device, said circuit connecting said electromagnetic wave receiving means and said electromagnetic wave transmitting means, a memory for storing data of the ID number, and a clock signal generator for generating pulses, said switch being responsive to said memory for turning on and off in accordance with the data from said memory and in synchronism with pulses from said clock signal generator to control the coupling between said electromagnetic wave receiving means and said electromagnetic wave transmitting means.

2. An ID card including electric wave receiving means for receiving an electric wave from a main station, modulation means for modulating a receiving signal in accordance with an ID number, and electric wave transmitting means for transmitting a modulated electric wave signal to the main station, the main station identifying the ID card on the basis of the modulated electric wave signal, comprising a substrate made of piezoelectric material, a bus bar connected to said receiving means, a bus bar connected to said device, an electrode connected to said bus bar connected to said receiving means to excite surface acoustic wave on said piezoelectric substrate, an electrode connected to said bus bar connected to said transmitting means to receive surface acoustic wave propagated on said piezoelectric substrate, a switching element including one end connected to one of said bus bars, a terminating device including one end connected to the other end of said switching element and the other end connected to the other bus bar, a clock signal generator, and a memory for storing the ID number as a digital signal and sending each bit signal of the digital signal for each clock signal from said clock signal generator to said switching element to control and turn said switching element on an doff such that when said switching element is on, said terminating device absorbs the electric wave from the main station while when said switching element is off, the electric wave from the main station received by said receiving means is sent from one bus bar to the other bus bar as a surface acoustic wave on said piezoelectric substrate to be transmitted to the main station through said transmitting means.

* * * * *